United States Patent
Wuensche et al.

(10) Patent No.: US 11,247,572 B2
(45) Date of Patent: Feb. 15, 2022

(54) REMOVABLE BATTERY COMPONENT CARRIER, BATTERY SYSTEM INCLUDING REMOVABLE BATTERY COMPONENT CARRIER, AND VEHICLE INCLUDING BATTERY SYSTEM

(71) Applicant: Samsung SDI Co., Ltd., Yongin-si (KR)

(72) Inventors: Ralph Wuensche, Graz (AT); Stephan Klomberg, Graz (AT); Thomas Brandner, Rosental (AT); Thomas Renger, Hitzendorf (AT); Joerg Killmann, Graz (AT); Miran Kojc, Maribor (SI)

(73) Assignee: SAMSUNG SDI CO., LTD., Yongin-si (KR)

( * ) Notice: Subject to any disclaimer, the term of this patent is extended or adjusted under 35 U.S.C. 154(b) by 33 days.

(21) Appl. No.: 16/466,899

(22) PCT Filed: Dec. 1, 2017

(86) PCT No.: PCT/KR2017/014002
§ 371 (c)(1),
(2) Date: Jun. 5, 2019

(87) PCT Pub. No.: WO2018/105957
PCT Pub. Date: Jun. 14, 2018

(65) Prior Publication Data
US 2020/0062130 A1 Feb. 27, 2020

(30) Foreign Application Priority Data

Dec. 5, 2016 (EP) ..................................... 16202176
Nov. 30, 2017 (KR) ........................ 10-2017-0163010

(51) Int. Cl.
*B60L 50/64* (2019.01)
*B60L 50/60* (2019.01)
(Continued)

(52) U.S. Cl.
CPC ............... *B60L 50/64* (2019.02); *B60L 50/66* (2019.02); *H01M 50/20* (2021.01); *B60K 6/28* (2013.01);
(Continued)

(58) Field of Classification Search
None
See application file for complete search history.

(56) References Cited

U.S. PATENT DOCUMENTS 6,864,013 B2   3/2005   Gow et al.
9,056,361 B2 *  6/2015   Ohata ...................... B23H 7/10
(Continued)

FOREIGN PATENT DOCUMENTS

CN    102110795 A    6/2011
CN    102473884 A    5/2012
(Continued)

OTHER PUBLICATIONS

EPO Office Action dated Sep. 25, 2019, for corresponding European Patent Application No. 16202176.0, (5 pages).
(Continued)

*Primary Examiner* — Alix E Eggerding
(74) *Attorney, Agent, or Firm* — Lewis Roca Rothgerber Christie LLP (57) ABSTRACT

A removable battery component for receiving a battery submodule and being mechanically and electrically connectable to other removable battery component carriers and/or a carrier frame is provided. The removable battery component carrier includes a bottom plate, a pair of side walls perpendicular to the bottom plate and extending along two facing (Continued)

corners of the bottom plate, a pair of end plates perpendicular to the bottom plate and the side wall, extending along two facing corners of the bottom plate, and mechanically connected to the side walls and/or the bottom plate to fix the plurality of battery cells together. A cell cover extends parallel to the bottom plate to form a receiving space of the battery submodule along with the bottom plate, the side wall, and the end plate.

23 Claims, 3 Drawing Sheets

(51) Int. Cl.
  *H01M 50/20* (2021.01)
  *B60K 6/28* (2007.10)
(52) U.S. Cl.
  CPC ....... *B60Y 2200/91* (2013.01); *B60Y 2200/92* (2013.01); *B60Y 2306/05* (2013.01); *B60Y 2400/112* (2013.01); *H01M 2220/20* (2013.01)

(56) References Cited

U.S. PATENT DOCUMENTS

| | | | |
|---|---|---|---|
| 2008/0118819 A1 | 5/2008 | Gamboa et al. | |
| 2010/0301807 A1 | 12/2010 | Gamboa et al. | |
| 2011/0135992 A1 | 6/2011 | Kim et al. | |
| 2011/0206948 A1* | 8/2011 | Asai | H01M 2/1077 |
| | | | 429/7 |
| 2011/0293974 A1 | 12/2011 | Yoon et al. | |
| 2011/0294000 A1* | 12/2011 | Kim | H01M 50/20 |
| | | | 429/176 |
| 2012/0164490 A1 | 6/2012 | Itoi et al. | |
| 2012/0188714 A1 | 7/2012 | Von Borck et al. | |
| 2012/0224326 A1 | 9/2012 | Kohlberger et al. | |
| 2013/0200700 A1 | 8/2013 | Ohkura et al. | |
| 2014/0199574 A1* | 7/2014 | Fink | H01M 50/258 |
| | | | 429/99 |
| 2014/0212713 A1 | 7/2014 | Yang et al. | |
| 2014/0295235 A1 | 10/2014 | Jung | |
| 2014/0302371 A1 | 10/2014 | Miyawaki et al. | |
| 2015/0042158 A1 | 2/2015 | Schmidt et al. | |
| 2016/0211561 A1* | 7/2016 | Nakagawa | H01M 10/6557 |
| 2016/0276638 A1 | 9/2016 | Sham | |
| 2016/0344071 A1 | 11/2016 | Zheng et al. | |
| 2017/0005371 A1 | 1/2017 | Chidester et al. | |
| 2017/0012269 A1 | 1/2017 | Grzywok et al. | |
| 2017/0098802 A1 | 4/2017 | Lee et al. | |
| 2017/0229683 A1* | 8/2017 | Snyder | B60L 50/64 |
| 2017/0365888 A1* | 12/2017 | Kwon | H01M 10/4207 |
| 2017/0373289 A1* | 12/2017 | Lee | H01M 10/6554 |
| 2018/0019508 A1 | 1/2018 | Lee et al. | |
| 2021/0273285 A1* | 9/2021 | Bluemel | H01M 50/209 |

FOREIGN PATENT DOCUMENTS

| | | |
|---|---|---|
| CN | 102576831 A | 7/2012 |
| CN | 103717433 A | 4/2014 |
| CN | 104064721 A | 9/2014 |
| CN | 104103871 A | 10/2014 |
| CN | 105977417 A | 9/2016 |
| CN | 106560936 A | 4/2017 |
| EP | 2 362 463 A2 | 8/2011 |
| ES | 1065338 U | 8/2007 |
| JP | 2011-119222 A | 6/2011 |
| KR | 10-2012-0005727 A | 1/2012 |
| KR | 10-1156527 B1 | 6/2012 |
| KR | 10-2013-0080144 A | 7/2013 |
| KR | 10-1382011 B1 | 4/2014 |
| KR | 10-2014-0118734 A | 10/2014 |
| KR | 10-1501026 B1 | 3/2015 |
| KR | 10-2016-0115582 A | 10/2016 |
| KR | 10-2016-0135344 A | 11/2016 |
| KR | 10-2017-0014924 A | 2/2017 |

OTHER PUBLICATIONS

Extended European Search Report for corresponding European Application No. 16202176.0, dated Feb. 9, 2017, 7pp.
Office action issued in corresponding European Application No. 16202176.0, dated Apr. 11, 2019, 6pp.
Extended European Search Report for corresponding European Patent Application No. 17205068.4, dated Jan. 19, 2018, 9 pages.
International Search Report for corresponding International Application No. PCT/KR2017/014121, dated Mar. 22, 2018, 4 pages.
EPO Office Action dated Jan. 3, 2020, for corresponding European Patent Application No. 17205068.4 (5 pages).
European Patent Office Action for corresponding European Patent Application No. 17 205 068.4, dated Aug. 7, 2020, 4 pages.
U.S. Office Action dated Aug. 19, 2021, issued in U.S. Appl. No. 16/466,942 (9 pages).
Chinese Office Action dated Aug. 9, 2021, issued in corresponding Chinese Patent Application No. 201780084989.0 (9 pages).
Chinese Office Action dated Aug. 10, 2021, issued in corresponding Chinese Patent Application No. 201780084975.9 (8 pages).
U.S. Notice of Allowance dated Dec. 7, 2021, issued in U.S. Appl. No. 16/466,942 (5 pages).

* cited by examiner

REMOVABLE BATTERY COMPONENT CARRIER, BATTERY SYSTEM INCLUDING REMOVABLE BATTERY COMPONENT CARRIER, AND VEHICLE INCLUDING BATTERY SYSTEM

CROSS-REFERENCE TO RELATED APPLICATION(S)

This application is a National Phase Patent Application of International Patent Application Number PCT/KR2017/014002, filed on Dec. 1, 2017, which claims priority to European Patent Application No. 16202176.0, filed Dec. 5, 2016, and Korean Patent Application No. 10-2017-0163010, filed Nov. 30, 2017. The entire contents of all of which are incorporated herein by reference.

TECHNICAL FIELD

The present invention relates to a removable battery component carrier, a battery system including a plurality of removable battery component carriers capable of being separately dividable, and a vehicle including the battery system.

BACKGROUND ART

Rechargeable batteries are widely used in various devices because they can be repeatedly charged and discharged. A low-capacity rechargeable battery is used as a power source for a small electronic device such as a mobile phone, a laptop computer, and a camcorder, and a high-capacity rechargeable battery is used a power source for driving a motor such as for a hybrid vehicle.

Generally, a rechargeable battery includes an electrode assembly that includes a positive electrode and a negative electrode, a separator interposed between the positive electrode and the negative electrode, a case housing the electrode assembly, and an electrode terminal that is electrically connected to the electrode assembly. The case may be made by being formed to be suitable for a usage purpose and a design of the device, such as cylindrical or rectangular.

The rechargeable battery uses a battery module formed of a plurality of unit cells coupled in series and/or in parallel according to a required energy density. That is, the battery module realizes the rechargeable battery by connecting electrode terminals of a plurality of battery cells to each other, and by connecting the electrode terminals of a plurality of unit batteries to each other according to the required amount power.

The battery module may be implemented in a block type or a module type. In the block type, each battery cell is combined with a common current collecting structure and a common battery management system and disposed in the housing. In the module type, a plurality of battery cells is connected to a submodule, and a plurality of submodules is connected to each other to form the module. In the latter case, the battery management function may be realized in the module or sub-module level, which is preferred in terms of exchangeability.

The high power rechargeable battery for an electric vehicle or a hybrid vehicle and the like may be realized by connecting one or more battery modules to each other. Thus, in order to configure the battery system, one or more battery modules are equipped with a thermal management system, and are mechanically and electrically integrated so as to communicate with at least one electricity consuming device such as a power consuming circuit or device. Thus, the thermal management system ensures safety and efficiency of the battery module by discharging heat generated from the rechargeable battery.

In order to achieve the mechanical integration, the battery system needs to be properly interconnected mechanically with each constituent member (e.g., a connection between the battery submodules and a connection structure with an electricity consuming device such as a vehicle). This connection structure should be implemented so as to maintain an average cycle-life of the battery system and the functionality and safety while using the electricity consuming device. An installation space and compatibility requirements must be particularly further considered in mobile applications.

To achieve the mechanical integration of the battery module, each battery cell or submodule may be disposed on a carrier plate by providing a carrier plate such as a bottom plate, for example. Fixing the battery cell or submodule to the carrier plate may be accomplished by fitting it in a recessed space of the carrier plate, connecting it by mechanically using bolts or screws, or accommodating the battery cell or the submodule. Fastening may be achieved by fixing the side plate of the battery cell or the submodule to the carrier plate. Additionally or alternatively, the battery submodule may be disassembled in the separate case arranged on the battery module, for example, on the carrier plate.

Although the conventional battery modules have the module structure, all components must be connected together to achieve the mechanical integration. Therefore, to replace, for example, the submodule that is part of the battery module, the entire battery module must usually be detached. If there is a defective component in the battery module, it is usually necessary to separate and replace the entire module and repair the battery module individually. The large capacity battery module is expensive, bulky, and heavy, and the above-described repair procedure is not only cumbersome, but also it difficult to store the battery module with the large volume in the workshop of the mechanic.

DISCLOSURE

The present invention provides a removable battery component carrier capable of being configured to receive and protect a battery submodule and mechanically and electrically connected to other removable battery component carrier and/or a carrier frame to configure a modular battery system.

The present invention provides a removable battery component carrier including a cooling channel capable of discharging heat generated from a battery submodule and configured to be connected to a cooling channel of an adjacent removable battery component carrier and a cooling channel of a carrier frame to make up an integrated cooling channel throughout an entire cooling system.

According to one aspect of the present invention, in a removable battery component receiving a battery submodule including a plurality of battery cells and mechanically and electrically connected to other removable battery component carriers and/or a carrier frame to configure a modular battery system, the removable battery component carrier includes a bottom plate, a pair of side walls perpendicular to the bottom plate and extending along two facing longitudinal direction corners of the bottom plate, a pair of end plates perpendicular to the bottom plate and the side wall, extending along two facing wing direction corners of the bottom plate, and mechanically connected to a pair of side walls and/or the bottom plate to fix the plurality of battery cells together, and a cell cover extending parallel to the bottom plate and making up a receiving space of the battery submodule along with the bottom plate, the side wall, and the end plate.

The cell cover may be fixed to the side wall. The cell cover may be clamped between the battery cell and the side wall. The cell cover may be fixed to the side wall by a screw. The cell cover may be made of a plastic material.

The removable battery component carrier may further include a cell connection and sensing unit CCU for electrically and electronically connecting the battery cell in the battery submodule, the battery cells are electrically connected in parallel or in series to each other, and the battery cells are electrically connected to the cell connection and sensing unit for monitoring a voltage and a temperature of the cells.

The CCU includes a tray supporting a bus bar for the cell connection. The CCU preferably further include a cell voltage and temperature monitoring circuit and a control wiring harness.

The bottom plate and the side wall may be made with an extrusion aluminum profile, a reinforced plastic extrusion profile, or a rolled and welded steel carrier. The bottom plate and the side wall may be made up a single member.

The end plate may be aluminum-extruded, partially dip-drawn with aluminum or steel, aluminum-casted, or made of an extrusion or cast applied with a reinforced plastic.

The bottom plate and/or the side wall may include a cooling channel for discharging heat from the battery cell. It is preferable that the cooling channel is designed to be connected to the cooling channel of the adjacent removable battery component carrier.

According to one aspect of the present invention, a battery system includes a carrier frame receiving the removable battery component carrier in plural. Each removable battery component carrier receives at least battery submodule including a plurality of battery cells and is capable of being separately removable from the carrier frame.

The battery system may further include a removable electric component carrier receiving a control electronic assembly and including a signal port and a power port.

It is preferable that the carrier frame includes a coolant port configured to be connected to the cooling channel of the removable battery component carrier.

The carrier frame may include two longitudinal direction segments and two wing direction segments perpendicular to the two longitudinal direction segments and connected to the two longitudinal direction segments, and the removable battery component carrier may include a connection member configured to be attached to the longitudinal direction segment or the wing direction segment. The carrier frame may further include a center segment reinforcing the carrier frame and extending parallel to the longitudinal direction segment to divide a receiving space inside the carrier frame into two sub spaces.

The plurality of removable battery component carriers may be mechanically connected through a plurality of bolts, and the battery system may further include one or more bus bars electrically connecting the removable electric component carrier and the removable battery component carrier, and electrically connecting the removable battery component carriers to each other.

A high voltage wiring harness is used to electrically connect the electronic component carrier to the removable battery component carrier and/or the battery submodule.

According to another aspect of the present invention, a vehicle includes the above-described battery system.

The battery system including the removable carrier according to the present invention allows the separate attachment/detachment of the battery submodule. Furthermore, each removable carrier is not only fixed to the battery system mechanically, but is also electrically connected to the other battery submodule and the battery system and builds an integration cooling channel integrating all submodules of the battery system.

An additional aspect of the present invention may be confirmed from dependent claims or a description below.

According to an exemplary embodiment of the present invention, easy assemble/disassemble/replacement of the modular battery system, easy service/repair, and cost reduction may be obtained by the plurality of removable battery component carriers that may be individually separated from the battery system.

DESCRIPTION OF THE DRAWINGS

The features of the present invention will be apparent to those of ordinary skill in the art to which the present invention belongs, by way of a detailed description of various embodiments with reference to the following drawings.

MODE FOR INVENTION

Hereinafter, embodiments of the present invention will be described in detail with reference to the accompanying drawings so that those skilled in the art can easily carry out the present invention. Hereinafter, effects and features of the present invention will be described in detail with reference to the accompanying drawings. In order to clearly illustrate the present invention in the drawings, duplicate descriptions are omitted and the same or similar constituent elements are given the same reference numerals throughout the specification.

In the description of the embodiments of the present invention, singular forms of expressions may include plural forms unless a context clearly dictates otherwise.

In the drawings, a size of constituent elements may be exaggerated for clarity. For example, although the size or the thickness is arbitrarily shown in the drawings to clearly illustrate each component, the present invention is not necessarily limited to those illustrated.

Spatial expressions such as "below", "under", "on the bottom", "above", "over", and "on the top" are intended to compare the characteristics of one component relative to another component, as shown in the drawings. On the other hand, a component according to the use or operation of the device can be oriented differently. Thus, the spatial representation is not limited to as shown in the drawings. If the orientation of the device shown in the drawing is reversed, one constituent element described as "below", "under", or "on the bottom" with respect to an opposing constituent element will be oriented "above", "over", or "on the top". Thus, expressions like below and above may include both the up and down directions. The device may be oriented to face in another direction, e.g., rotated 90 degrees, etc., and the spatial relative description used herein should be interpreted accordingly.

When a component or layer is referred to as being "on", "connected to", or "coupled to" to another component or layer, there may be one or more components or layers between the components or layers. In addition, when it is described that one component or layer is present between two other components or layers, at least one other intermediate component or layer may also be included between said components or layers.

Figure 1:
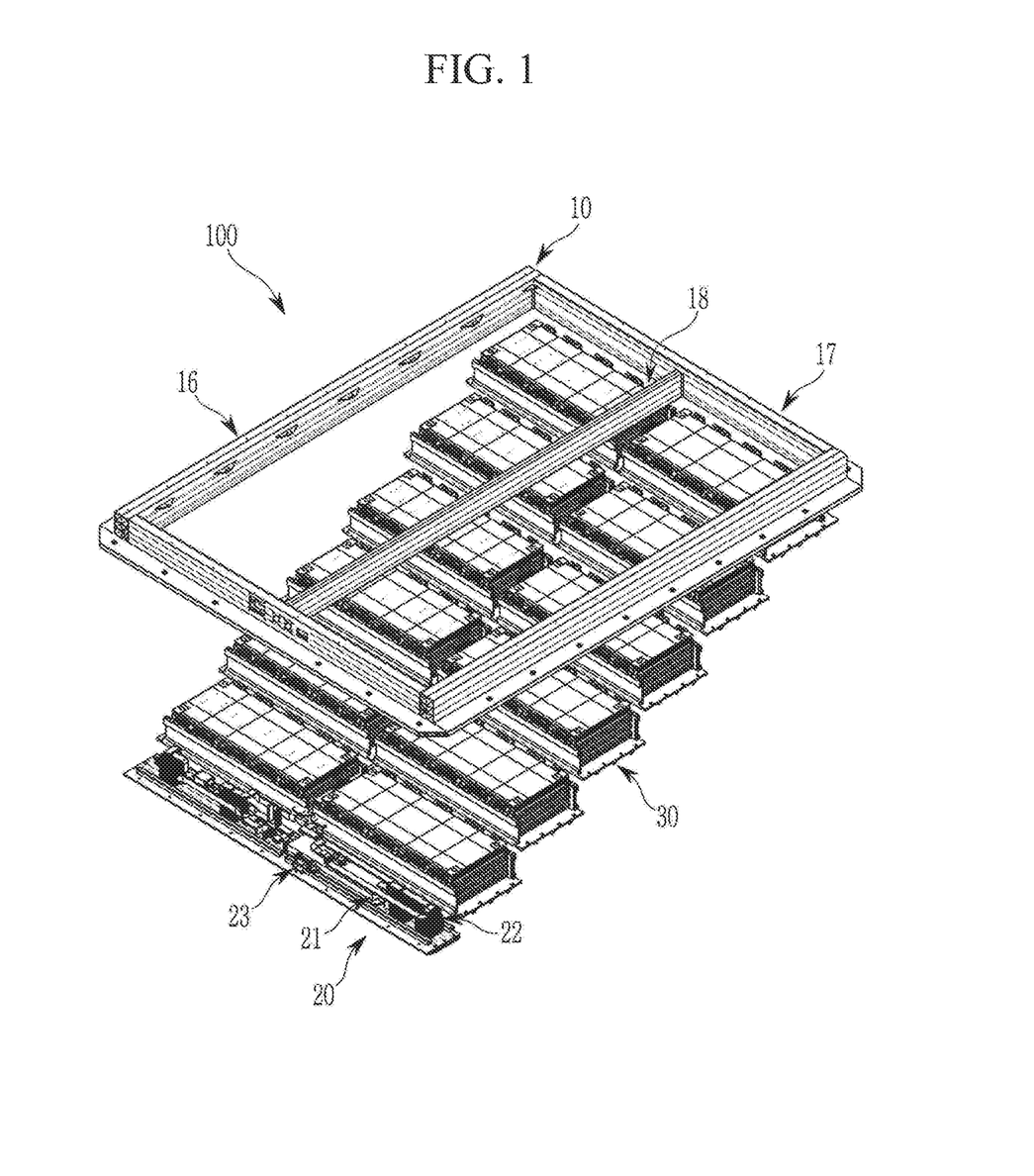
FIG. 1 is an exploded perspective view of a battery system according to an exemplary embodiment of the present invention.

Referring to FIG. 1, a preferable exemplary embodiment of a battery system 100 according to the present invention is shown. The battery system 100 includes a removable electric component carrier 20 and a carrier frame 10 receiving a plurality of removable battery component carriers 30. According to a preferable exemplary embodiment of FIG. 1, the carrier frame 10 receives six removable battery component carriers 30, but a number of the removable battery component carriers 30 is not limited thereto.

Figure 2:
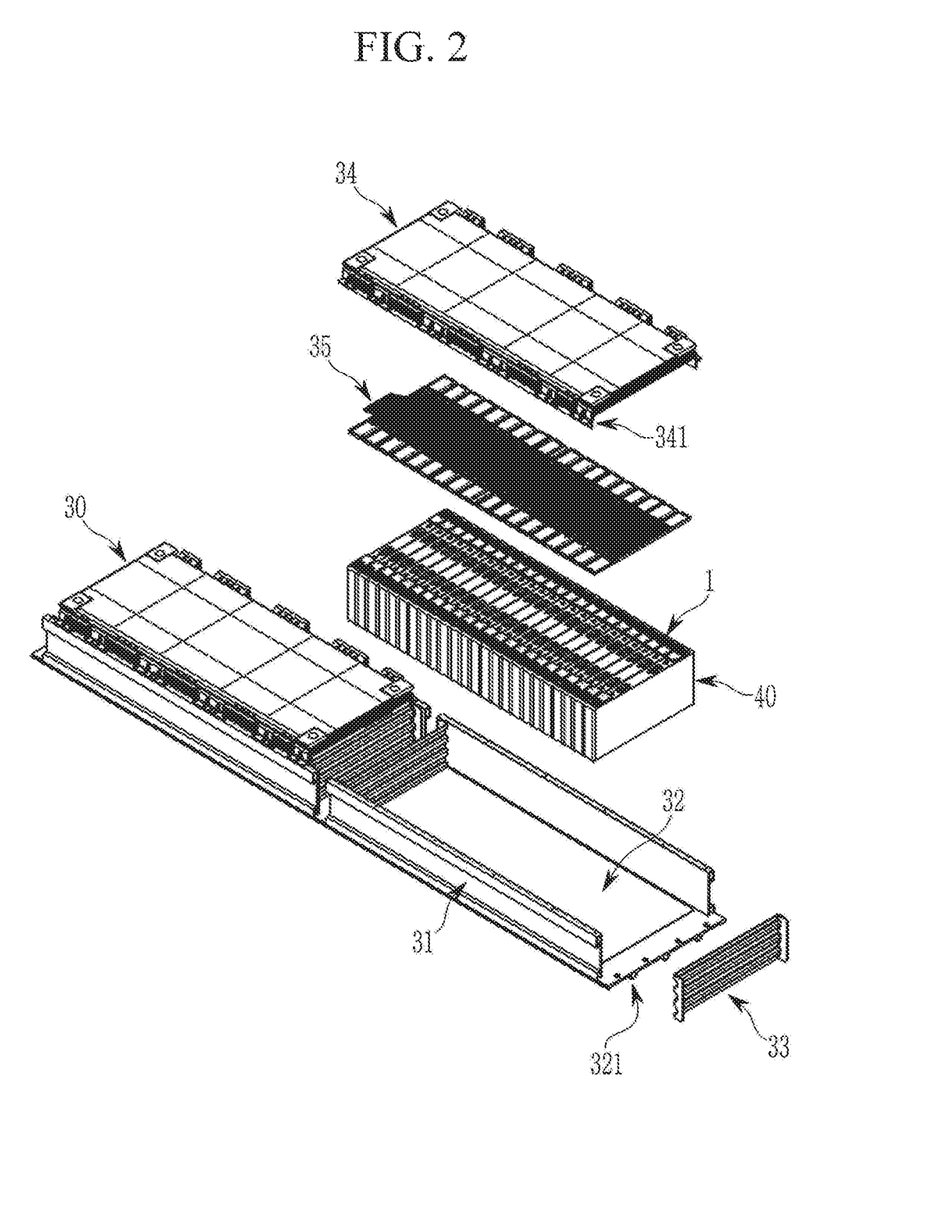
FIG. 2 is an exploded perspective view of a removable battery component carrier according to an exemplary embodiment of the present invention.

Each removable battery component carrier 30 may include one battery submodule 40 (referring to FIG. 2) or more respectively including a plurality of battery cells 1 (referring to FIG. 2). According to a preferable exemplary embodiment of FIG. 1, the removable battery component carrier 30 receives two battery submodules 40, however a number of the battery submodules 40 is not limited thereto.

The carrier frame 10 includes two longitudinal direction segments 16 and two transversal direction segments 17 for making up a rectangular frame. One transversal direction segment 17 may be configured to include an external signal port connected to an external control unit (not shown) and an external power port connected to an external power circuit (not shown). The carrier frame 10 may further include a center segment 18 extending parallel to the longitudinal direction segment 16 and dividing a receiving space inside the carrier frame 10 into two sub spaces.

The removable electric component carrier 20 includes a bottom plate and a control electronic assembly 21 positioned above the bottom plate. The removable electric component carrier 20 includes a signal port 22 for transmitting a control signal between an external control circuit (not shown) and the control electronic assembly 21 and a power port 23 for connecting the carrier frame 10 to an external power circuit (not shown), for example, a power circuit of the battery system, a battery management system, or directly to at least one electricity consuming device.

Based on the control signal (e.g., an actual power demand), the control electronic assembly 21 controls the battery submodule 40 disposed above the removable component carrier 30 to provide power that meets the actual demand. The control electronic assembly 21 is electrically connected to the electronic component carrier 20. That is, the control electronic assembly 21 is electrically connected to the adjacent removable battery component carrier 30 and is also electrically connected to the battery submodule 40 attached to the removable battery component carrier 30, and is further connected to the next adjacent battery removable component carrier 30, etc. Through this electronic coupling, the control electronic assembly 21 transmits the control signal for controlling the battery submodule 40. In response to this signal, the current provided from the battery submodule 40 is transmitted through the above electrical connection. Preferably, the control signal is modulated based on the current or voltage between the electronic component carrier 20 and the removable battery component carrier 30 or the battery submodule 40.

The bottom surface of the bottom plate of the electronic component carrier 20 is provided with a cooling channel through which a coolant may flow. The electronic component carrier 20 may be separately isolated from the battery system 100, which simplifies the replacement and repair of the control electronic assembly.

Referring to FIG. 2, the removable battery component carrier 30 separated from the battery system 100 is shown. The removable battery component carrier 30 includes a connection member (not shown) adapted to be attached corresponding to a connecting member (e.g., a threaded hole) of the longitudinal direction segment 16 of the carrier frame 10 to be fixed to the carrier frame 10. Furthermore, the removable battery component carrier 30 includes a connection member (not shown) for electrical and electronic connection with the electric component carrier 20 mutually or attachable/detachably in the battery system 100. For example, the electrical connection may be made by a high voltage (HV) wiring harness or a bus bar, and the electronic connection may be made by a low voltage (LV) wiring harness, but these connection types are not limited thereto.

The removable battery component carrier 30 includes a bottom plate 32 and a pair of side walls 31 positioned at the longitudinal direction edge of the bottom plate 32 and upward extending from the bottom plate 32. In a preferred exemplary embodiment, the bottom plate 32 and the side wall 31 may be made up a single member. The bottom plate 32 and the side wall 31 may be made with an extruded aluminum profile, a reinforced plastic extrusion profile, or a rolled and welded steel carrier including a bottom plate and side wall.

Figure 3:
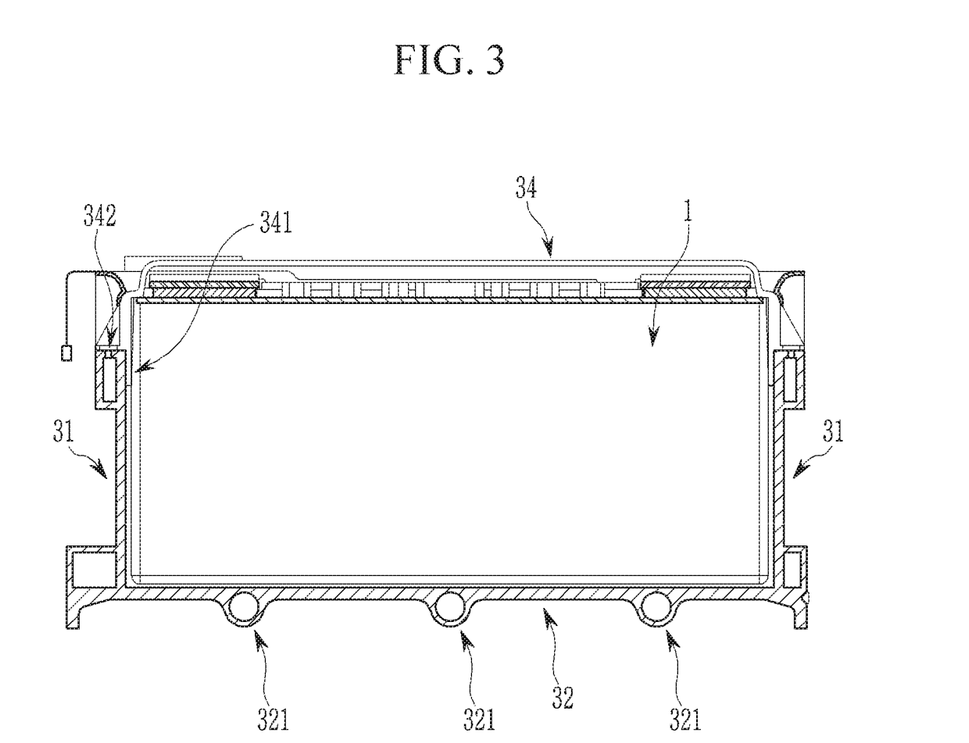
FIG. 3 is a schematic cross-sectional view of a removable battery component carrier of FIG. 2.

The bottom plate 32 and side wall 31 may include a cooling channel independent of the direction in which the battery is disposed. The cooling channel discharges heat generated from the battery cell. FIG. 3 shows three cooling channels 321 provided in the bottom plate 32. A coolant distribution line connected to an external coolant port disposed above the wing direction segment 17 of the carrier frame 10 and including a plurality of connection pieces may be provided. Here, for each connection piece, the coolant distribution line may be connected to one of the cooling channels 321 disposed at the bottom plate 32 through each coolant port (not shown) of each removable battery component carrier 30. The coolant is provided to the external coolant port of the carrier frame 10 by an external coolant circuit (not shown). The coolant is provided to the coolant port of the removable electric component carrier 20 and a plurality of removable battery component carriers 30 through the coolant distribution line, flows through each cooling channel 321 provided in each bottom plate 32 toward the facing wing direction segment 17, and again flows to another among the external coolant ports along the other coolant distribution line.

Referring to FIG. 2, according to the preferred exemplary embodiment of the battery submodule 40, a plurality of aligned secondary battery cells 1 having substantially the same plan shape are included. The battery cell 1 is assembled to the battery stack by a pair of end plates 33 provided on the front surface of the outermost battery cell 1 and then is mounted on the removable battery component carrier 30. Alternatively, one of the end plates 33 may be first fixed to the side wall 31 and/or the bottom plate 32 of the removable battery component carrier 30, and then the battery cell stack may be attached to the removable battery component carrier 30. Finally, the second end plate 33 is fixed to another member of the removable battery component carrier 30. The battery cell stack may be previously assembled in the longitudinal direction along with the end plate 33 that may be provided on one or two front surfaces of the battery cell stack. When being assembled advance, it may be fixed by an elastic member, a spring, or a screw.

The end plate 33 is mechanically coupled to the side wall 31 of the battery component carrier 30. The technique of joining the end plate 33, the bottom plate 32, and the side wall 31 of the removable battery component carrier 30 may use a conventional welding process. For example, friction stir welding, tungsten inert gas welding, clinching, tightening, riveting, and wedging can be applied. The plurality of battery cells 1 are fixed together in the first direction (a transverse direction) by the side wall 31 and in the second direction (a longitudinal direction) by the end plate 33.

The end plate 33 may be aluminum-extruded, or partially dip-drawn into aluminum or steel, or may be made by the extrusion or the casting applied with casted aluminum or reinforced plastics.

The end plate 33 provides rigidity and mechanical stability to the battery submodule 40. The end plate 33 may prevent the battery cell 1 from expanding, and the end plate 33 absorbs a cell expanding force to be guided to the battery component carrier 30. The expansion of the battery cell 1 occurs during the cell aging process.

According to the preferred exemplary embodiment of FIG. 2, the removable battery component carrier 30 receives two battery submodules 40. In this case, two end plates 33 located at the center between two cell stacks may be integrally made up. The integral center end plate may be aluminum-extruded, or partially dip-drawn into aluminum or steel, or may be made by the extrusion or the casting applied with casted aluminum or reinforced plastics. The integrated center end plate helps prevent a large cell from expanding inside each cell stack and bypasses the expansion of the cell to the outside of the cell stack.

The battery cell 1 is further tightened in the third direction (vertical) by a cell cover 34 disposed at the top of the battery cell stack. The cell cover 34 is fixed to the side wall 31 of the battery component carrier 30. For example, the cell cover 34 may be clamped between the battery cell 1 and the side wall 31, or for example, the cell cover 34 may include a pair of clamps 341, and the clamps 341 may be disposed on the side of the cell cover 34 and extended downward to be inserted between the battery cell 1 and the side wall 31. The cell cover 34, for example as shown in FIG. 3, may be fixed to the side wall 31 by screws 342, or may be further fitted in the side wall 31 of the battery component carrier 30 in other manners. The cell cover 34 holds the battery cell in the normal place and has a touch protection function.

A cell connection and sensing unit CCU 35 may include a battery connector, a sensor, and an electronic device, and may be provided between the cell cover 34 and the battery submodule 40. The cell connection and sensing unit CCU 35 includes a connection terminal continuously connected to the terminal of the battery cell 1, and a printed circuit board (PCB) having at least one semiconductor element disposed at the upper surface of the circuit board. The circuit board further includes a wiring pattern (not shown) disposed on the surface of the circuit board. The body of the circuit board may be made of a rigid electrical insulation material such as polyimide (PI) or polyethylene (PET). The wiring pattern may be made of an electrically conductive material such as copper (Cu), titanium (Ti), nickel (Ni), or palladium (Pd).

The semiconductor device is configured to apply a signal for controlling the operation of the battery cell 1. Particularly, the semiconductor device may control the charging and discharging through a high current line of the battery cell 1. The semiconductor device may further prevent an overcharge or an over-discharge by applying a signal indicating the voltage, the current, and the state of charge (SOC) of the battery cell 1.

The cell connection and sensing unit CCU 35 includes a connection piece for a flexible high voltage and low voltage to be balanced corresponding to a cell expansion and a cell distance. The cell connection and sensing unit CCU 35 includes a main power path to mutually connect the cell and positive and negative terminals of the cell through the bus bar, a voltage sensing line for the voltage sensing, the cell balancing, and the mutual connection thereof, a temperature sensor for temperature monitoring of the cell and the mutual connection thereof, and a flexible carrier of low weight for fixing all constituent elements. This cell connection and sensing unit CCU 35 provides easy and automatic handling and may compensate a relative movement when cell breathing and cell swelling occurs. Alternatively, the cell connection and sensing unit CCU 35 may have a mounting capability for a cell monitoring circuit (CSC-PCB).

The battery submodule 40 is mechanically fixed to the removable battery component carrier 30 by a fixing member, and is tightly enclosed in a receiving space within the battery component carrier 30. The battery submodule 40 may additionally be bonded to the bottom plate 32 or the side wall 31 for being further fixed in the vertical direction.

The removable battery component carrier 30 may be mounted on the carrier frame 10 of the battery system 100, including the battery cell 1, the end plate 33, the cell cover 34, and additional accessories, thereby being removable even if the battery system 100 is mounted within the vehicle.

DESCRIPTION OF SYMBOLS

1: secondary battery cell 32: bottom plate
10: carrier frame 321: cooling channel
16: longitudinal direction segment 33: end plate
17: wing direction segment 34: cell cover
18: center segment 341: cell cover clamp
20: removable electric component carrier 342: screw
21: control electronic assembly 35: cell connection and sensing unit CCU
22: signal and power port 40: battery submodule
30: removable battery component carrier 100: battery system
31: side wall

The invention claimed is:

1. A battery system comprising a carrier frame and a plurality of removable battery component carriers, the carrier frame receiving the plurality of removable battery component carriers, each of the removable battery component carriers receiving a battery submodule comprising a plurality of battery cells, each of the removable battery component carriers comprising:
a bottom plate;
a pair of side walls perpendicular to the bottom plate and extending along two facing longitudinally-extending edges of the bottom plate;
a pair of end plates perpendicular to the bottom plate and the side walls, extending along two facing laterally-extending edges of the bottom plate, the end plates being mechanically connected to the side walls and/or the bottom plate to fix the plurality of battery cells together; and
a cell cover extending parallel to the bottom plate and being removably coupled to the side walls, wherein the cell cover, the side walls, and the end plates together form a receiving space for the battery submodule, wherein the carrier frame comprises a plurality of longitudinal direction segments extending in a first direction, a center segment parallel to the longitudinal direction segments, and a plurality of lateral direction segments extending in a second direction perpendicular to the first direction and connected to the longitudinal direction segments and the center segment, wherein the center segment of the carrier frame divides the receiving space into a plurality of sub-spaces, wherein the removable battery component carriers are electrically connected to each other, wherein the removable battery component carriers are mechanically connected to only the longitudinal direction segments, the center segment, and/or the lateral direction segments of the carrier frame, and wherein the removable battery component carriers are removable from the battery system in a third direction perpendicular to the first and second directions.

2. The battery system of claim 1, wherein the cell cover is clamped between the battery cells and the side walls.

3. The battery system of claim 1, wherein the cell cover is coupled to the side walls by a screw.

4. The battery system of claim 1, wherein the cell cover is made of a plastic material.

5. The battery system of claim 1, further comprising a cell connection and sensing unit between the cell cover and the battery submodule.

6. The battery system of claim 1, wherein the bottom plate and the side walls are made with an extrusion aluminum profile, a reinforced plastic extrusion profile, or a rolled and welded steel carrier.

7. The battery system of claim 1, wherein the end plates are aluminum-extruded, partially dip-drawn with aluminum or steel, aluminum-casted, or are made of an extrusion or cast applied with a reinforced plastic.

8. The battery system of claim 1, wherein the bottom plate and/or the side walls comprises a cooling channel for discharging heat from the battery cells.

9. The battery system of claim 1, wherein each of the removable battery component carriers is configured to be separately removable from the carrier frame in the third direction.

10. The battery system of claim 9, further comprising a removable electric component carrier receiving a control electronic assembly and comprising a signal port and a power port.

11. The battery system of claim 10, further comprising a plurality of bus bars,
wherein the removable battery component carriers are mechanically connected through a plurality of bolts, and
wherein the bus bars electrically connect the removable electric component carrier and the removable battery component carriers, and electrically connect the removable battery component carriers to each other.

12. The battery system of claim 9, wherein:
the bottom plate and/or the side walls comprises a cooling channel for discharging heat from the battery cells; and
the carrier frame comprises a coolant port configured to be connected to the cooling channel of at least one of the removable battery component carriers.

13. The battery system of claim 9, wherein:
the carrier frame comprises two of the longitudinal direction segments and two of the lateral direction segments perpendicular to the two longitudinal direction segments and connected to the two longitudinal direction segments; and
each of the removable battery component carriers further comprises a connection member configured to be attached to at least one of the longitudinal direction segments or to at least one of the lateral direction segments.

14. The battery system of claim 13, wherein the cell cover of each of the removable battery component carriers is accessible through the carrier frame between the two longitudinal direction segments and the two lateral direction segments.

15. A vehicle comprising the battery system of claim 9.

16. The battery system of claim 1, wherein each of the removable battery component carriers receives two of the battery submodules, the battery submodules being spaced apart from each other in each of the battery component carriers, and
wherein the center segment of the carrier frame extends between the spaced apart battery submodules in each of the battery component carriers.

17. The battery system of claim 16, wherein the carrier frame has open areas between the longitudinal direction segments, the center segment, and the lateral direction segments, and
wherein the cell cover is removable from the removable battery component carriers through the open areas of the carrier frame in the third direction.

18. The battery system of claim 1, wherein the cell cover comprises a pair of clamps at a side portion of the cell cover and extending in a downward direction, and
wherein the pair of clamps are configured to be inserted between the battery cells and the side walls.

19. The battery system of claim 1, wherein the bottom plates of the removable battery component carriers are exposed to an exterior of the battery system.

20. A battery system comprising a carrier frame and a plurality of removable battery component carriers, the carrier frame receiving the plurality of removable battery component carriers, each of the removable battery component carriers receiving a battery submodule comprising a plurality of battery cells, each of the removable battery component carriers comprising:
a bottom plate;
a pair of side walls perpendicular to the bottom plate and extending along two facing longitudinally-extending edges of the bottom plate;
a pair of end plates perpendicular to the bottom plate and the side walls, extending along two facing laterally-extending edges of the bottom plate, the end plates being mechanically connected to the side walls and/or the bottom plate to fix the plurality of battery cells together; and
a cell cover extending parallel to the bottom plate and being removably coupled to the side walls,
wherein the cell cover, the side walls, and the end plates together form a receiving space for the battery submodule,
wherein the carrier frame comprises a plurality of longitudinal direction segments extending in a first direction, a center segment parallel to the longitudinal direction segments, and a plurality of lateral direction segments extending in a second direction perpendicular to the first direction and connected to the longitudinal direction segments and the center segment, wherein the center segment of the carrier frame divides the receiving space for the battery submodule into a plurality of sub-spaces, wherein the plurality of longitudinal direction segments and the plurality of lateral direction segments form a receiving space for the removable battery component carriers, wherein the receiving space for the removable battery component carriers is exposed by opposite openings, wherein the removable battery component carriers are electrically connected to each other, wherein the removable battery component carriers are mechanically connected to only the longitudinal direction segments, the center segment, and/or the lateral direction segments of the carrier frame, and wherein the removable battery component carriers are removable from the battery system in a third direction perpendicular to the first and second directions.

21. The battery system of claim 20, wherein the cell cover comprises a pair of clamps at a side portion of the cell cover and extending in a downward direction, and
wherein the pair of clamps are configured to be inserted between the battery cells and the side walls.

22. The battery system of claim 20, wherein the bottom plates of the removable battery component carriers are exposed to an exterior of the battery system.

23. The battery system of claim 20, wherein each of the removable battery component carriers is configured to be separately removable from the carrier frame in the third direction.

* * * * *